United States Patent [19]

Ishida et al.

[11] 4,217,692
[45] Aug. 19, 1980

[54] GARDENING SHEARS

[76] Inventors: Kimikazu Ishida, 7-15, Fukui 3-chome, Miki City, Hyogo Prefecture; Tsuneo Ishida, 1270-72, Shukuhara, Miki City, Hyogo Prefecture, both of Japan

[21] Appl. No.: 972,258

[22] Filed: Dec. 22, 1978

[30] Foreign Application Priority Data

Dec. 27, 1977 [JP] Japan .............................. 52-176479[U]

[51] Int. Cl.² .......................................... B26B 13/22
[52] U.S. Cl. ........................................ 30/128; 30/131
[58] Field of Search ........................... 30/128, 131, 134

[56] References Cited

U.S. PATENT DOCUMENTS

| 1,458,878 | 6/1923 | Dexter | 30/134 |
| 1,862,033 | 6/1932 | Porter | 30/131 |
| 1,901,739 | 3/1933 | Engel | 30/131 |
| 2,529,171 | 11/1950 | Menser | 30/128 X |

Primary Examiner—Jimmy C. Peters
Attorney, Agent, or Firm—Armstrong, Nikaido, Marmelstein & Kubovcik

[57] ABSTRACT

Gardening shears having holding members and cutting blades extending therefrom crossing at the location of a driving means with cutting blades having lines thereon, respectively, and the repelling member located adjacent to the cutting lines of blades whereby upon operation of the blades in opening and closing, the repelling member reciprocally swings from side to side between the cutting blades through the intermediary of the driving means.

5 Claims, 5 Drawing Figures

GARDENING SHEARS

BACKGROUND OF THE INVENTION

The present invention relates to gardening shears.

Conventional gardening shears have two cutting blades laid one on the other crosswise and pivotally mounted to each other by a pin.

Accordingly, in trimming, for example, hedges, already cut twigs or herbs fall onto trimmed trees or shrubs, which may render it difficult to accurately determine the trimmed state of trees or shrubs. It is, therefore, required to stop the trimming work already initiated in order to determine the trimmed state, and shake off the cut refuse by hand or with the shears, whereby continuous trimming work is never possible.

The objects of this invention are to remedy the above mentioned deficiency and further to provide gardening shears capable of repelling immediately and far away cut herbs or twigs from the cutting blades thereof, whereby no cut refuse may fall and remain onto the trimmed trees or shrubs.

Attempts to remedy the defects and drawbacks of the past which regard to gardening shears had not been successful. This included variations on the blades structure and the like all of which fail to achieve the result which has been achieved by the present invention.

Primary object of the present invention is to provide gardening shears which overcome the problems and deficiencies associated with past gardening shears and particularly, in relation to the rejection of refuse to a substantial distance from the shrub or tree being trimmed.

Another object of the present invention is to provide a device of the class indicated which is capable of the functions referred to and which is based upon good mechanical principles wherein the operation of the cutting blades and the repelling member result in a rejection to a substantial distance of refuse from trimming of trees or shrubs so that the refuse does not fall upon those trees or shrubs thus interferring with the trimming operation and causing other difficulties and problems as well appear hereinafter.

Other objects will appear hereinafter.

SUMMARY OF THE INVENTION

In accordance with the present invention, a device in the form of gardening shears is provided including a body with holding members extending therefrom and cutting blades extending therefrom with the cutting blades have cutting lines respectively thereon and further having a driving means disposed on the shears body and associated with the opening and closing of the cutting blades, and including a repelling member extending alone adjacent to the cutting lines of the cutting blades such that during the opening and closing of the cutting blades, the repelling member will reciprocally swing from side to side between the cutting blades in the direction of the opening and closing thereof through the intermediary of the driving means.

BRIEF DESCRIPTION OF THE DRAWINGS

The present invention will be further described by way of example, with reference to the accompanying drawings, and reference will be made to the attached drawing figures forming part of the present application and in which.

DETAILED DESCRIPTION OF THE DRAWINGS

Figure 3:
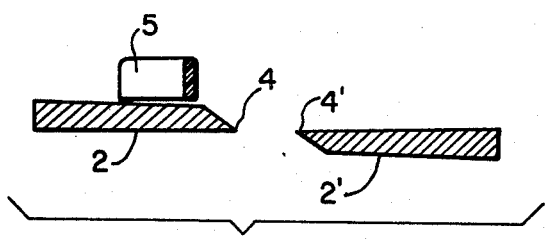
FIG. 3 is an enlarged sectional view taken along the line A—A of FIG. 1.
Figure 4:
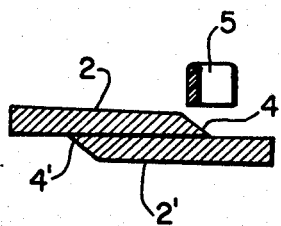
FIG. 4 is an enlarged sectional view taken along with the line B—B of FIG. 2.

Referring now to the drawings, shears in accordance with the present invention comprise shears body 1 having holding members 1' and 1" and cutting blades 2 and 2', driving means 3 associating with the opening and closing operations of the cutting blades 2 and 2', which have cutting lines 4 and 4' respectively, and a repelling member 5 which is slender in form and essentially adjacent to cutting line 4 or 4' of either cutting blade 2 or 2'. The base of repelling member 5 engages the driving means 3.

In use, the holding members 1' and 1" are held by hands and the cutting blades 2 and 2' are opened or closed. Associated with this opening or closing operation, the repelling member 5 swings from side to side through the driving means 3 disposed on the shears body 1. The driving means may be, for example, linkage structure provided at the holding member 1'.

Figure 1:
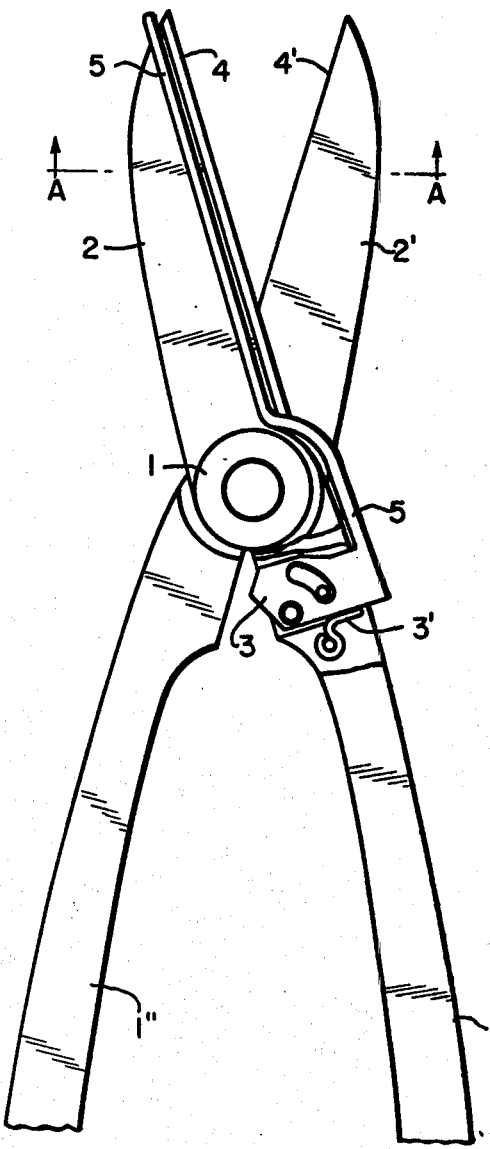
FIG. 1 is a plan view of the gardening shears in accordance with the present invention, of which the main portion is broken away.
Figure 2:
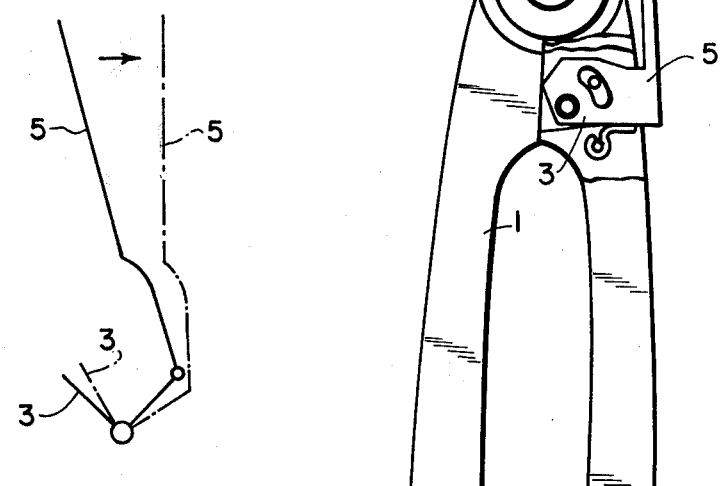
FIG. 2 is a plan view of the gardening shears of FIG. 1 with the cutting blades thereof closed.
Figure 5:
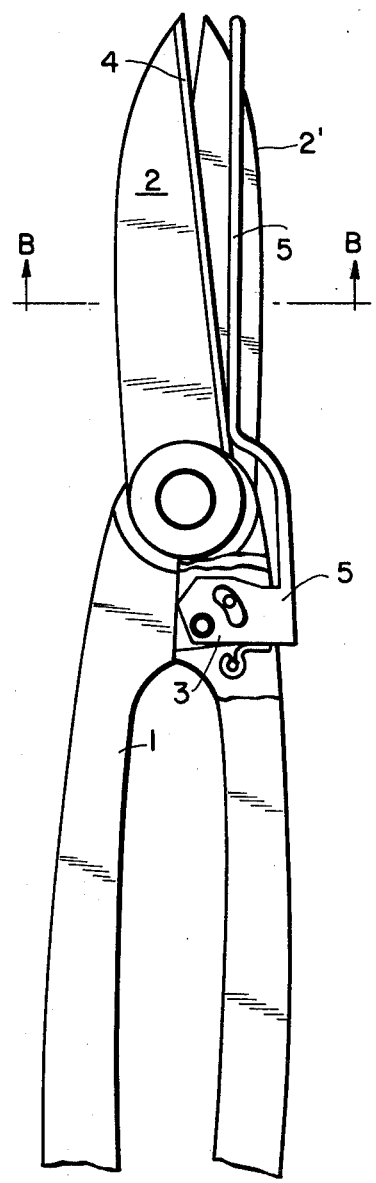
FIG. 5 is a view showing operation of a repelling member and driving means associated with the opening and closing operations of the cutting blades.

When the cutting blades 2 and 2' are opened (FIG. 1), the repelling member 5 is adjacent to the cutting blade 2. When the cutting blades 2 and 2' are closed (FIG. 2) the driving means 3 forcibly strikes against the holding member 1" opposite to the holding member 1' which supports the driving means 3, and then rotates clockwise. Along with this rotation, the repelling member 5 immediately moves toward the cutting blade 2' side. The driving means 3 is so constructed that the repelling member 5 rotates counterclockwise and is restored onto the cutting blade 2 along with restoration of the driving means 3 caused by a return spring 3' thereof, when the cutting blades 2 and 2' are opened again.

In this construction, simultaneously with the cutting operation of the cutting blades 2 and 2', the cut refuse is rejected as the repelling member 5 moves from the cutting blade 2 side to the cutting blade 2' side in association with the opening and closing operation of the cutting blades 2 and 2', thereby prohibiting the refuse from falling and remaining on the trees or shrubs being trimmed. Thus, continuous and smooth trimming work may be carried out while accurately determining the trimmed state of trees or shrubs without stopping the trimming work.

When using conventional gardening shears, the cut refuse falling onto the trimmed trees or shrubs must be removed by hand or manually with the shears. However, some of the cut refuse may still remain. As the time passes, such remainder will die and injure the beauty of the trees and shrubs.

The gardening shears in accordance with the present invention can reject to a substantial distance simultaneously with the cutting operation, thereby leaving no cut refuse on the trimmed trees or shrubs, thus creating no risk of injuring the beauty thereof.

Furthermore, cut refuse remaining on trees or shrubs will permit harmful insects or pathogemic bacteria to build a nest, thus decreasing tree force. It is, therefore, absolutely required after the trimming work to carefully remove all cut refuse, which is generally not possible. The gardening shears in accordance with the present invention reject refuse simultaneously with the cutting operation, thus producing no possibility of harmful insects or pathogenic bacterial on the trimmed trees or shrubs, which would subsequently result in decreased tree strength.

Accordingly, the present invention provides gardening shears in which a repelling member moves from side to side between the cutting blades simultaneously with the opening and closing operation thereof, through the intermediary of a driving means in association with the opening and closing operation of the cutting blades, whereby twigs or herbs cut by the blades may be rejected to a substantial distance simultaneously with the cutting operation, thus leaving no cut refuse on the trimmed trees or shrubs.

The present invention may be embodied in other specific form without departing from the spirit or essential characteristics thereof. The presently disclosed embodiments are, therefore, to be considered in all respects as illustrative and not restrictive, the scope of the invention being indicated by the appended claims rather than by the foregoing description, and all changes which come within the meaning and range equivalency of the claims are therefore intended to be embraced therein.

What is claimed is:

1. Gardening shears comprising a shears body, holding members, cutting blades having cutting lines, a driving means disposed on said shears body, a repelling member adjacent to the said cutting lines on said cutting blades.

2. Gardening shears according to claim 1, wherein the driving means is so disposed on the shears body as to be associated with the opening and closing of the said cutting blades.

3. Gardening shears according to claim 2, wherein the repelling member extends along said cutting lines of said cutting blades in parallel relationship therewith.

4. Gardening shears according to claim 3, wherein the repelling member reciprocally swings from side to side between said cutting blades upon the opening and closing thereof.

5. Gardening shears comprising:
   (a) shears body having holding members, cutting blades extending from the said body and said cutting blades having cutting lines and respectively thereon;
   (b) a driving means disposed on said shears body associated with the opening and closing of said cutting blades;
   (c) a repelling member extending along said cutting lines on said cutting blades, and disposed so that the base of said repelling member engages said driving means, and
   (d) whereby upon the opening and closing of said cutting blades and, said repelling member reciprocally swings from side to side between said cutting blades in the direction of the opening and closing thereof through the intermediary of said driving means.

* * * * *